United States Patent
Deneszczuk et al.

(10) Patent No.: US 10,132,364 B2
(45) Date of Patent: Nov. 20, 2018

(54) BACKING PLATE PROVIDING AXIAL STIFFNESS

(71) Applicant: GM GLOBAL TECHNOLOGY OPERATIONS LLC, Detroit, MI (US)

(72) Inventors: Gregory W. Deneszczuk, Royal Oak, MI (US); Manuel Martinez Sanchez, Pontiac, MI (US); Scott W. Heitzenrater, Orion, MI (US); Angela R. Bertolini, Fenton, MI (US)

( * ) Notice: Subject to any disclaimer, the term of this patent is extended or adjusted under 35 U.S.C. 154(b) by 147 days.

(21) Appl. No.: 15/223,448

(22) Filed: Jul. 29, 2016

(65) Prior Publication Data

US 2018/0031048 A1 Feb. 1, 2018

(51) Int. Cl.
| | |
|---|---|
| F16D 13/64 | (2006.01) |
| F16D 13/52 | (2006.01) |
| F16D 25/00 | (2006.01) |
| F16D 28/00 | (2006.01) |

(52) U.S. Cl.
CPC ............. *F16D 13/52* (2013.01); *F16D 13/64* (2013.01); *F16D 25/00* (2013.01); *F16D 28/00* (2013.01); *F16D 2200/003* (2013.01); *F16D 2200/0021* (2013.01); *F16D 2250/0023* (2013.01); *F16D 2250/0084* (2013.01)

(58) Field of Classification Search
CPC ..... F16D 2250/0084; F16D 2200/0021; F16D 2200/003; F16D 2250/0023; F16D 25/00; F16D 13/64; F16D 13/52; F16D 13/648; F16D 28/00

See application file for complete search history.

(56) References Cited

U.S. PATENT DOCUMENTS

| | | | |
|---|---|---|---|
| 1,732,965 A | * | 10/1929 | Carhart ................... F16D 13/52 |
| | | | 192/70.2 |
| 3,941,221 A | | 3/1976 | Pringle |
| 4,020,937 A | | 5/1977 | Winter |

(Continued)

FOREIGN PATENT DOCUMENTS

| | | |
|---|---|---|
| FR | 2533005 A1 | 3/1984 |
| GB | 902093 A | 7/1962 |

OTHER PUBLICATIONS

U.S. Application filed Jul. 29, 2016; U.S. Appl. No. 15/223,402, Applicant: GM Global Technology Operations LLC; Title: Multiple-Piece Backing Plate Having Parts Made of Different Materials.

*Primary Examiner* — Ramya P Burgess
*Assistant Examiner* — Lillian T Nguyen

(57) ABSTRACT

A backing plate configuration and a friction clutch assembly for an automotive transmission are provided. The backing plate configuration includes a main body having a reaction section connected to a perpendicularly disposed strength section. The thickness of the strength section may be less than or equal to the thickness of the reaction section. The friction clutch assembly includes interleaved first and second clutch plates. The main body (of the backing plate) is disposed adjacent to an end second clutch plate. The main body is piloted by and/or splined to the same transmission member as the end second clutch plate. In an engaged position, the end second clutch plate is compressed directly against and into contact with the main body. A method of forming the backing plate configuration is included, which includes stamping of the main body.

20 Claims, 3 Drawing Sheets

(56) References Cited

U.S. PATENT DOCUMENTS

| | | |
|---|---|---|
| 5,234,090 A | 8/1993 | Haka |
| 5,511,644 A * | 4/1996 | Murata .................. F16D 13/52 |
| | | 192/109 F |
| 5,653,321 A * | 8/1997 | Takaoka ................ F16D 13/648 |
| | | 188/71.5 |
| 5,701,976 A | 12/1997 | Kumagai |
| 5,901,826 A | 5/1999 | Datta |
| 6,206,158 B1 | 3/2001 | Mueller |
| 7,063,197 B2 | 6/2006 | Merkel |
| 8,479,907 B2 | 7/2013 | Schneegans |
| 8,821,336 B2 | 9/2014 | Wilton |
| 8,844,699 B2 | 9/2014 | Schömig |
| 8,932,169 B2 | 1/2015 | Paciotti |
| 2003/0141163 A1 | 7/2003 | Doremus |
| 2004/0079607 A1 | 4/2004 | Osman |
| 2005/0000776 A1* | 1/2005 | Merkel ................ F16D 13/648 |
| | | 192/109 R |
| 2011/0139567 A1* | 6/2011 | Hauck .................. F16D 13/648 |
| | | 192/70.11 |
| 2015/0362022 A1* | 12/2015 | Heitzenrater ........... F16D 13/70 |
| | | 192/70.14 |
| 2016/0178015 A1 | 6/2016 | Mordukhovich |
| 2016/0245344 A1 | 8/2016 | Heitzenrater |

* cited by examiner

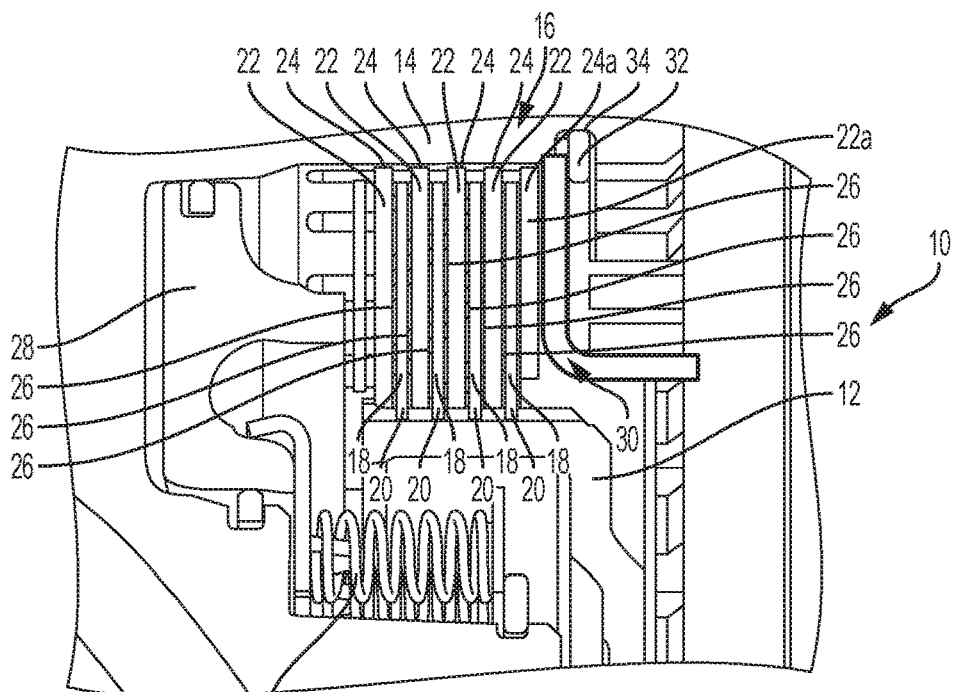
FIG. 1
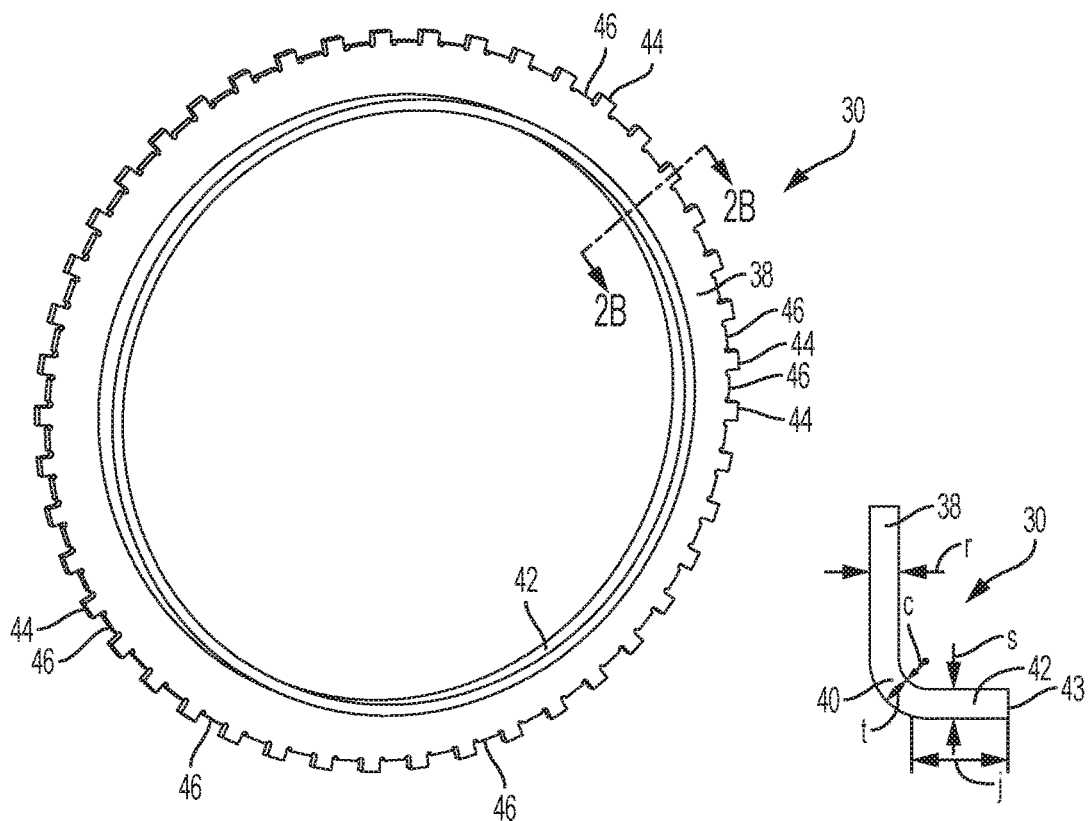
FIG. 2A
FIG. 2B

US 10,132,364 B2

BACKING PLATE PROVIDING AXIAL STIFFNESS

FIELD

The present disclosure relates to friction clutch pack assemblies used in automatic motor vehicle transmissions, and more particularly, to a backing plate configuration for a friction clutch pack assembly.

INTRODUCTION

A typical multiple speed transmission uses a combination of friction clutches, planetary gear arrangements, and fixed interconnections to achieve a plurality of gear ratios. The number and physical arrangement of the planetary gear sets, generally, are dictated by packaging, cost and desired speed ratios.

Friction clutch pack assemblies for engaging and disengaging various gears within a transmission typically include interleaved clutch plates that are compressed against a backing plate. The backing plate may be formed of a cast material or powdered metal. The backing plate is expected to act as a stiff member against which the clutch plates can be compressed. Accordingly, backing plates are typically relatively thick, as compared to the clutch plates, to provide the required axial stiffness. However, even with the thick backing plates that have been typical, the backing plate experiences bending and may not provide the desired stiffness.

Governmental regulations and/or consumer demands require that vehicle components continue to become lighter and cheaper, however, the backing plate must still be capable of providing a certain amount of axial stiffness against which the friction clutch plates can be compressed to provide an effective coupling between transmission components. Therefore, there exists a need for new and improved backing plates that have better performance while meeting government and consumer requirements.

SUMMARY

The present disclosure provides a backing plate for a friction clutch assembly that provides for increased axial stiffness and a reduction in mass of the backing plate itself, and which may be formed by stamping. A same-side (piloted and/or splined to same component) stamped reaction plate can be combined with a stamped main body backing plate to provide an effective two-part backing plate having increased axial stiffness.

In one form, which may be combined with or separate from the other forms disclosed herein, a friction clutch assembly for an automatic transmission is provided. The friction clutch assembly includes a plurality of first clutch plates coupled to a first transmission member and a plurality of second clutch plates interleaved with the plurality of first clutch plates. The plurality of second clutch plates is coupled to a second transmission member via a second member spline. A main body backing plate is disposed adjacent to an end second clutch plate of the plurality of second clutch plates. The main body backing plate is either or both of the following: a) piloted by the second transmission member; and b) splined to the second transmission member. The friction clutch assembly is configured to be moved between an engaged position and a disengaged position. In the engaged position, the first and second transmission members are coupled together by compressing the pluralities of first and second clutch plates against the main body backing plate. The end second clutch plate is compressed directly against and into contact with the main body backing plate when the friction clutch assembly is in the engaged position.

In another form, which may be combined with or separate from the other forms disclosed herein, a backing plate configuration is provided for use in a friction clutch assembly that is configured to be engaged and disengaged. The backing plate configuration includes a main body that has a reaction section configured to be compressed against by a plurality of interleaved clutch plates when the friction clutch assembly is engaged. The reaction section defines a reaction section thickness. A strength section is connected to the reaction section, and the strength section is disposed generally perpendicular to the reaction section. The strength section defines a strength section thickness that is less than or equal to the reaction section thickness.

In yet another form, which may be combined with or separate from the other forms disclosed herein, a method of forming a backing plate configuration is provided for use in a friction clutch assembly that is configured to be engaged and disengaged. The method includes a step of obtaining a single piece of metal material and a step of stamping the single piece of metal material into a main body of a backing plate, wherein the main body has a reaction section, a curved corner, and a strength section, and wherein the reaction section is configured to be compressed against by a plurality of interleaved clutch plates when a friction clutch assembly is engaged, and further wherein the strength section is disposed generally perpendicular to the reaction section, the curved corner connecting the strength section to the reaction section.

Additional features may optionally be provided in connection with any of the forms described above, such as: the main body backing plate being piloted by the second transmission member; the main body backing plate being splined to the second transmission member; the main body backing plate being attached to the end second clutch plate; the main body backing plate including a reaction section; the end second clutch plate being compressed directly against and into contact with the reaction section of the main body backing plate when the friction clutch assembly is in the engaged position; the reaction section defining a reaction section thickness; the main body backing plate further including a strength section connected to the reaction section; the strength section being disposed generally perpendicular to the reaction section; the strength section defining a strength section thickness that is less than or equal to the reaction section thickness; the reaction section and the strength section being unitarily formed with each other; further comprising a curved corner section connecting the reaction section with the strength section; the curved corner section being unitarily formed with the reaction section and the strength section; the main body backing plate being formed of a stamped material; the main body backing plate being formed into a final backing plate shape by stamping; the stamped material being steel, a steel alloy, or aluminum; further comprising an actuator disposed on one side of the pluralities of first and second clutch plates; the actuator configured to compress the pluralities of first and second clutch plates into the engaged position; the actuator being electric, hydraulic, or pneumatic; a spring configured to return the pluralities of first and second clutch plates to the disengaged position; further comprising a snap ring retaining the main body backing plate to the second transmission member; a face of each of the first and second clutch plates bearing friction material thereon; further comprising a reaction plate disposed directly adjacent to the main body; each of the main body and the reaction plate being piloted by and/or splined to the same transmission component; the main body backing plate defining a plurality of indented darts therein; the method further comprising disposing a reaction plate directly adjacent to the main body to form an effective two-part backing plate configuration; the method further comprising forming the strength section having a strength section thickness and forming the reaction section having a reaction section thickness, the strength section thickness being less than or equal to the reaction section thickness.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a cross-sectional view of a portion of an automatic transmission having a friction clutch assembly and a backing plate configuration, in accordance with the principles of the present disclosure;

FIG. 2A is a perspective view of a main body of the backing plate configuration shown in FIG. 1, according to the principles of the present disclosure;

FIG. 2B is a cross-sectional view of the main body of the backing plate configuration shown in FIGS. 1-2A, taking along the line 2B-2B of FIG. 2A, in accordance with the principles of the present disclosure;

Figure 4:
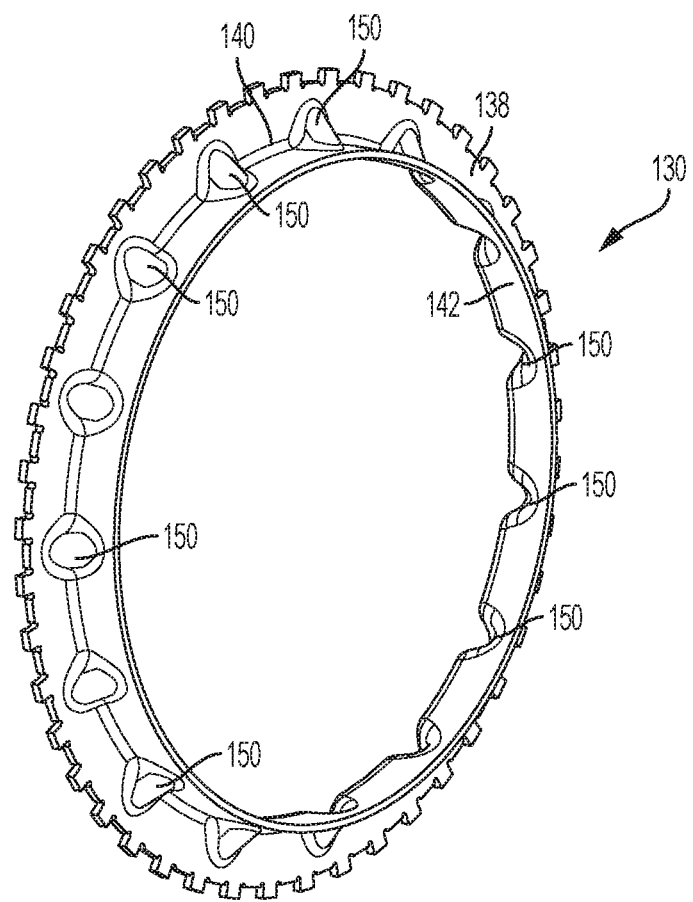
Figure 5:
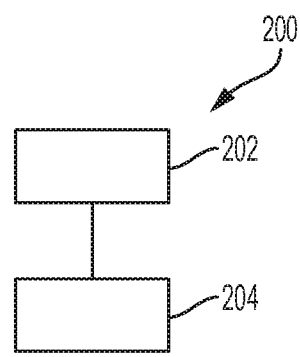

FIG. 4 is perspective view of another variation of the main body of the backing plate configuration shown in FIG. 1, according to the principles of the present disclosure; and FIG. 5 is a block diagram illustrating a method of forming a backing plate configuration for use in a friction clutch assembly that is configured to be engaged and disengaged, in accordance with the principles of the present disclosure.

DETAILED DESCRIPTION

The following description is merely exemplary in nature and is not intended to limit the present disclosure, application, or uses.

With reference to FIG. 1, an illustration of a portion of an automotive transmission is illustrated and generally designated at 10. The transmission 10 may include a plurality of planetary gear assemblies, which are generally not shown, but one of more gears of which may be coupled to the hub 12 and/or the clutch housing 14. Operably disposed between the hub 12 and the clutch housing 14 is a friction clutch assembly 16 configured to selectively couple the hub 12 (and any planetary gear elements, shafts, or stationary elements coupled to the hub 12) to the clutch housing 14 (and any planetary gear elements, shafts, or stationary elements coupled to the clutch housing 14).

The friction clutch assembly 16 includes a first plurality of smaller diameter clutch plates or discs 18 which are coupled by interengaging male and female splines 20 to the hub 12, which is an inner torque carrying member. A second plurality of larger diameter friction clutch plates or discs 22 are coupled by interengaging male and female splines 24 to the clutch housing 14, which is an outer generally annular torque carrying member. The clutch housing 14 could be a housing or a case, for example. The plurality of second clutch plates 22 are interleaved with the plurality of first clutch plates 18. In accordance with conventional friction clutch practice, at least one face of the friction clutch plates or discs 18, 22 includes friction material 26 disposed thereon. At one end of the friction clutch assembly 16 (the left end in the orientation of FIG. 1) is disposed a hydraulic, electric or pneumatic operator or actuator 28, which selectively provides an axial compressive force to the friction clutch assembly 16 to cause torque transfer therethrough and to move the friction clutch assembly 16 into an engaged position. A spring 29 is configured to return the friction clutch assembly 16 to a disengaged position when the actuator 28 is released.

At the other end of the friction clutch pack or assembly 16 (the right end in the configuration of FIG. 1) is disposed an annular stamped main body backing plate 30. The main body backing plate 30 is located and restrained against axial motion away from the operator 28 and the friction clutch assembly 16 by a snap ring 32, or similar component received and seated within a circumferential channel or groove 34. The main body backing plate 30 may be either simply piloted by the clutch housing 14, or splined to the clutch housing 14.

Though the main body backing plate 30 is shown and described as being piloted by and/or splined to the outer clutch housing 14, it should be understood that the main body backing plate 30 could alternatively be piloted by or splined to an inner member, such as the hub 12.

The main body backing plate 30 is disposed directly adjacent to an end second clutch plate 22a of the plurality of second clutch plates 22. In some examples, the main body backing plate 30 may even be attached to the end second clutch plate 22a, for example, by a joint, weld, or glue.

Referring now to FIGS. 2A-2B, the main body backing plate 30 is illustrated. The main body backing plate 30 includes a reaction section 38, where the end second clutch plate 22a is configured to be compressed directly against and into contact with the reaction section 38 of the main body backing plate 30 when the friction clutch assembly 16 is in the engaged position.

A corner section 40 connects the reaction section 38 to a strength section 42. The corner section 40 forms a round bend between the reaction section 38 and the strength section 42 having a radius of curvature c. The reaction section 38, the corner section 40, and the strength section 42 may be formed unitarily as one-piece from a single piece of a metal, by way of example. The reaction section 38 may have a plurality of male and female splines 44, 46 extending therefrom.

The reaction section 38 is disposed generally perpendicular to the strength section 42. The reaction section 38 defines a reaction section thickness r, and the strength section 42 defines a strength section thickness s. In some forms, the strength section thickness s may be less than or equal to the reaction section thickness r. In some forms, the reaction section thickness r is substantially equal to the strength section thickness s and a corner section thickness t.

Thus, the main body backing plate 30 may be formed by stamping; in other words, the main body backing plate 30 may be formed of a stamped material, and formed into a final backing plate shape by stamping. The stamped material used for the main body backing plate 30 may be steel, a steel alloy, aluminum, or any other suitable material. As the strength section 42 is drawn out through the stamping process, the strength section thickness s may become slightly less than the reaction section thickness r. The strength section 42 may have a long length j to develop hoop stress to better resist hooping, or bending, as the clutch plates 18, 22 are compressed against the main body backing plate 30.

The strength section 42 extends axially away from the reaction section 38 to a distal end 43. The main body backing plate 30 thus defines an "L" in cross section, with the foot of the "L" (the strength section 42) being closer to the center axis of the transmission 10, in this example. The end second clutch plate 22a and the main body backing plate 30 carry torque from the first and second sets of clutch plates 18, 22.

The end second clutch plate 22a is splined to the clutch housing 14 via a spline 24a, and the adjacent main body backing plate 30 may be splined or not splined to the clutch housing 14, the main body backing plate 30 providing axial stiffness to the backing plate configuration via the strength section 42. Deflection of the main body backing plate 30 is thus lesser than with typical backing plates by virtue of the long length j of the strength section 42, which has increased hoop stress.

The main body backing plate 30 and the adjacent end second clutch plate 22a together form an effective two-part backing plate against which the pluralities of first and second clutch plates 18, 22 react. This is because the main body backing plate 30 is piloted by, and may be splined to, the same transmission component as the end second clutch plate 22a is splined. In the illustrated example, the main body backing plate 30 and the end second clutch plate 22a are both piloted by the clutch housing 14, which is a driven member in this example. It should be understood that the main body backing plate 30 and the end second clutch plate 22a could alternatively be piloted by and/or splined to a driving member, such as the hub 12.

The backing plate configuration may thus comprise the main body backing plate 30 and the end second clutch plate 22a, which function together as a stop or travel limit against which the first and second friction plates or discs 18, 22 are compressed.

Figure 3A:
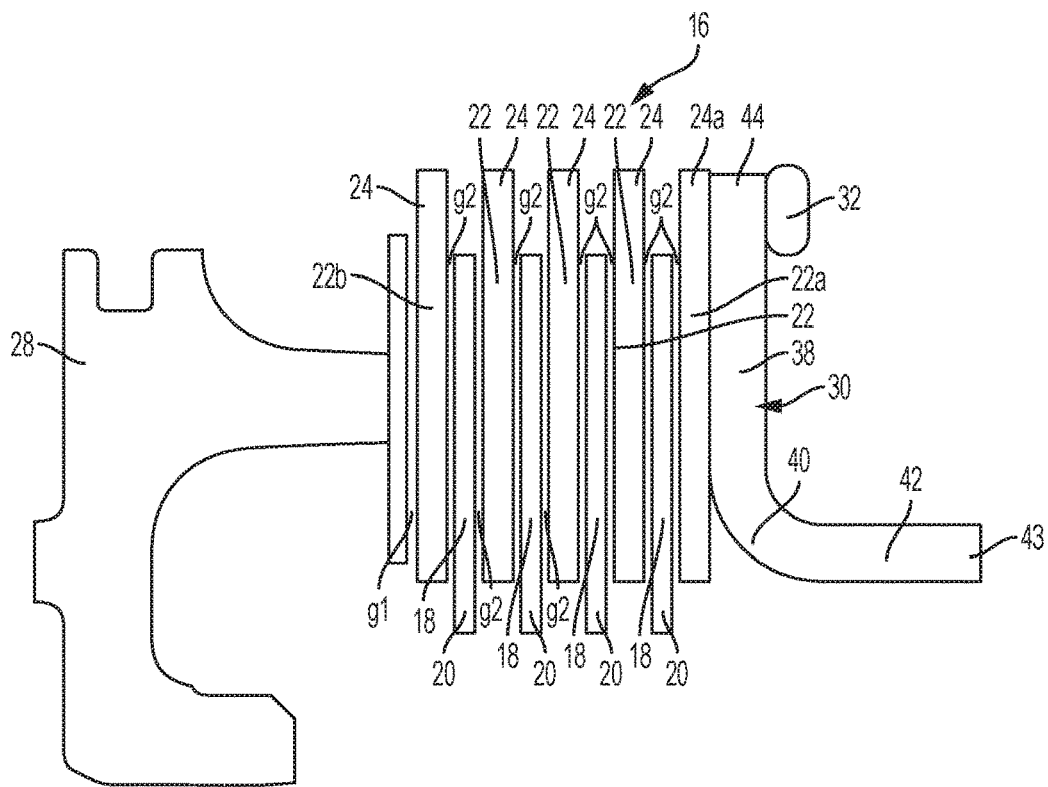
FIG. 3A is a cross-sectional view of the friction clutch assembly shown in FIG. 1, showing the friction clutch assembly in a disengaged position, according to the principles of the present disclosure.

Referring now to FIG. 3A, the friction clutch assembly 16 is illustrated in a disengaged position. In the disengaged position, the actuator 28 is disengaged from a front end clutch plate 22b, and a small gap g1 may exist between the actuator 28 and the front end clutch plate 22b. FIG. 3A also shows minute gaps g2 between each of the first and second clutch plates 18, 22; however, it should be understood that the minute gaps g2 may not be gaps at all, but rather, mere slippage between the first and second clutch plates 18, 22. There may also be a gap or slippage between the main body backing plate 30 and the end second clutch plate 22a if the two are not connected together, when the clutch assembly 16 is in the disengaged position.

Figure 3B:
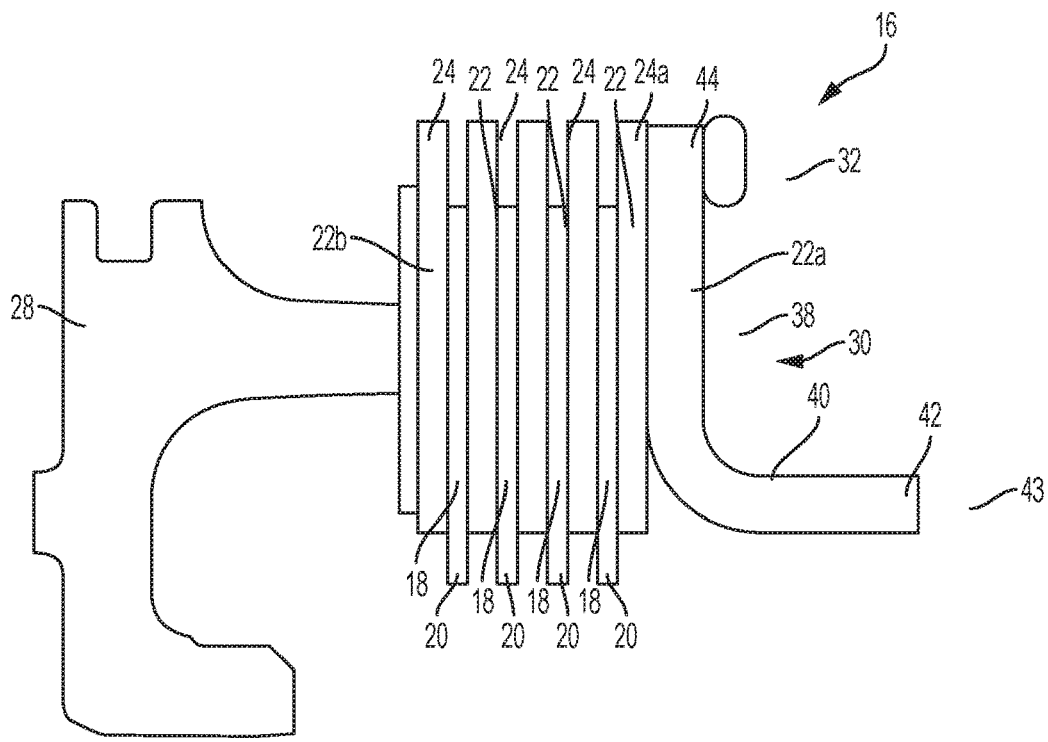
FIG. 3B is a cross-sectional view of the friction clutch assembly shown in FIGS. 1 and 3A, showing the friction clutch assembly in an engaged position, in accordance with the principles of the present disclosure.

The clutch assembly 16 is configured to be moved between the disengaged position and an engaged position. In the engaged position, which is illustrated in FIG. 3B, the actuator 18 contacts and compresses the front end clutch plate 22b and compresses the pluralities of first and second clutch plates 18, 22 against the end second clutch plate 22a and the main body backing plate 30. In the engaged position, the transmission members 12, 14 to which the clutch plates 18, 22 are splined are coupled together by compressing the pluralities of first and second clutch plates 18, 22 against the main body backing plate 30, where the end second clutch plate 22a is compressed directly against and into contact with the main body backing plate 30 when the friction clutch assembly 16 is in the engaged position. In the engaged position, there are no gaps g1, g2, and there is negligible or no slippage between the actuator 28 and the clutch plates 18, 22.

Referring now to FIG. 4, an alternative variation of the main body backing plate is illustrated and generally designated at 130. It should be understood that the backing plate 130 may be used in place of the backing plate 30 illustrated above in the clutch assembly 16. The main body backing plate 130 may be the same or similar to the backing plate 30 described above, having a reaction section 138 and a strength section 142 connected by a corner section 140. The main body backing plate 130 in this variation comprises a plurality of indented darts 150 formed through the corner section 140 to provide for reduced mass and/or added stiffness.

Either illustrated main body backing plate 30, 130 could also include lightening holes (not shown) to further reduce the mass of the main body backing plate 30, 130. For example, radial cuts, slots or channels (not shown) may extend through the corner section 40, 140, the reaction section 38, 138, or the strength section 42, 142 of the main body backing plate 30, 130.

The backing plate configuration disclosed herein allows for mass reduction when compared to typical backing plates. Further, greater axial stiffness is provided due to the long length j that can be stamped for the strength section 42, 142.

Referring now to FIG. 5, a method of forming a backing plate configuration for use in a friction clutch assembly that is configured to be engaged and disengaged is provided and schematically illustrated at 200. The method 200 includes a step 202 of obtaining a single piece of metal material. The metal may be provided as steel or a steel alloy, or aluminum, by way of example.

The method 200 further includes a step 204 of stamping the single piece of metal material into a main body of a backing plate, the main body having a reaction section, a curved corner, and a strength section. The reaction section is configured to be compressed against by a plurality of interleaved clutch plates when a friction clutch assembly is engaged, and the strength section is disposed generally perpendicular to the reaction section. The curved corner connects the strength section to the reaction section.

The method 200 may include additional optional steps, such as a step of disposing a reaction plate directly adjacent to the main body of the backing plate to form an effective two-part backing plate configuration. The method 200 may also include steps of forming the strength section having a strength section thickness and forming the reaction section having a reaction section thickness, the strength section thickness being less than or equal to the reaction section thickness.

The description provided herein is merely exemplary in nature and variations that do not depart from the gist thereof are intended to be within the spirit and scope of the present disclosure. Such variations are not to be regarded as a departure from the spirit and scope of the present disclosure.

What is claimed is:

1. A friction clutch assembly for an automatic transmission comprising, in combination, a plurality of first clutch plates coupled to a first transmission member;

a plurality of second clutch plates interleaved with the plurality of first clutch plates and coupled to a second transmission member via a second member spline; and a main body backing plate disposed adjacent to an end second clutch plate of the plurality of second clutch plates, the main body backing plate being at least one of the following:

piloted by the second transmission member and splined to the second transmission member, the main body backing plate including a reaction section and a strength section connected to the reaction section and extending to a distal free end away from the end second clutch plate, the strength section being disposed generally perpendicular to the reaction section, the reaction section defining a reaction section thickness and the strength section defining a strength section thickness that is less than or equal to the reaction section thickness, wherein the friction clutch assembly is configured to be moved between an engaged position and a disengaged position, and wherein in the engaged position, the first and second transmission members are coupled together by compressing the pluralities of first and second clutch plates against the main body backing plate, the end second clutch plate being compressed directly against and into contact with the reaction section of the main body backing plate when the friction clutch assembly is in the engaged position.

2. The friction clutch assembly of claim 1, the main body backing plate being piloted by the second transmission member.

3. The friction clutch assembly of claim 1, the main body backing plate being splined to the second transmission member.

4. The friction clutch assembly of claim 1, the main body backing plate being attached to the end second clutch plate.

5. The friction clutch assembly of claim 1, the reaction section and the strength section being unitarily formed with each other.

6. The friction clutch assembly of claim 5, further comprising a curved corner section connecting the reaction section with the strength section, the curved corner section being unitarily formed with the reaction section and the strength section.

7. The friction clutch assembly of claim 6, the main body backing plate being formed of a stamped material.

8. The friction clutch assembly of claim 7, the main body backing plate being formed into a final backing plate shape by stamping.

9. The friction clutch assembly of claim 8, wherein the stamped material is one of steel, a steel alloy, and aluminum.

10. The friction clutch assembly of claim 8, further comprising:

an actuator disposed on one side of the pluralities of first and second clutch plates, the actuator configured to compress the pluralities of first and second clutch plates into the engaged position, the actuator being one of electric, hydraulic and pneumatic;

a spring configured to return the pluralities of first and second clutch plates to the disengaged position; and a snap ring retaining the main body backing plate to the second transmission member, and wherein a face of each of the first and second clutch plates bears friction material thereon.

11. The friction clutch assembly of claim 10, wherein the main body backing plate defines a plurality of indented darts therein.

12. A backing plate configuration for use in a friction clutch assembly that is configured to be engaged and disengaged, the backing plate configuration comprising a main body defining an "L" shaped cross-section, the main body including:

a reaction section configured to be compressed against by a plurality of interleaved clutch plates when the friction clutch assembly is engaged, the reaction section defining a reaction section thickness; and a strength section connected to the reaction section, the strength section being disposed generally perpendicular to the reaction section, the strength section defining a strength section thickness that is less than or equal to the reaction section thickness.

13. The backing plate configuration of claim 12, the reaction section and the strength section being unitarily formed with each other.

14. The backing plate configuration of claim 13, the main body being formed of a stamped material.

15. The backing plate configuration of claim 14, the main body being formed into a final shape by stamping.

16. The backing plate configuration of claim 15, wherein the stamped material is one of steel, a steel alloy, and aluminum.

17. The backing plate configuration of claim 15, the main body further comprising a curved corner section connecting the reaction section with the strength section, the curved corner section being unitarily formed with the reaction section and the strength section.

18. The backing plate configuration of claim 17, further comprising a reaction plate disposed directly adjacent to the main body, each of the main body and the reaction plate being piloted by a first transmission component.

19. The backing plate configuration of claim 17, further comprising a reaction plate disposed directly adjacent to the main body, each of the main body and the reaction plate being splined to a first transmission component.

20. A backing plate configuration for use in a friction clutch assembly that is configured to be engaged and disengaged, the backing plate configuration comprising a main body including:

a reaction section configured to be compressed against by a plurality of interleaved clutch plates when the friction clutch assembly is engaged, the reaction section defining a reaction section thickness; and a strength section connected to the reaction section, the strength section being disposed generally perpendicular to the reaction section, the strength section defining a strength section thickness that is less than or equal to the reaction section thickness, the reaction section and the strength section being unitarily formed with each other, the main body being formed of a stamped material, the main body being formed into a final shape by stamping, the main body further comprising a curved corner section connecting the reaction section with the strength section, the curved corner section being unitarily formed with the reaction section and the strength section, wherein the main body defines a plurality of indented darts therein.

* * * * *